United States Patent [19]

Prevorsek et al.

[11] 4,157,360

[45] Jun. 5, 1979

[54] THERMOFORMABLE COMPOSITIONS COMPRISING A CROSSLINKED POLYCYANURATE POLYMER AND A THERMOPLASTIC POLYMER

[75] Inventors: Dusan C. Prevorsek, Morristown; Daniel C. Chung, Edison, both of N.J.

[73] Assignee: Allied Chemical Corporation, Morris Township, Morris County, N.J.

[21] Appl. No.: 900,226

[22] Filed: Apr. 26, 1978

[51] Int. Cl.$^2$ .................. C08L 69/00; C08G 63/64
[52] U.S. Cl. .................. 260/860; 260/463; 428/379; 428/458; 526/60; 528/176; 528/182; 528/193; 528/197
[58] Field of Search .................. 260/860, 47 XA, 463; 428/458, 379

[56] References Cited

U.S. PATENT DOCUMENTS

| | | | |
|---|---|---|---|
| 4,026,913 | 5/1977 | Tanigaichi et al. | 260/463 |
| 4,034,018 | 7/1977 | Habermeier | 260/860 |
| 4,046,796 | 9/1977 | Rottloff et al. | 260/463 X |
| 4,053,538 | 10/1977 | Herweh et al. | 260/860 |

FOREIGN PATENT DOCUMENTS

| | | |
|---|---|---|
| 2546315 | 4/1977 | Fed. Rep. of Germany. |
| 2549529 | 5/1977 | Fed. Rep. of Germany. |
| 2546296 | 5/1977 | Fed. Rep. of Germany. |

OTHER PUBLICATIONS

Korshak et al., in Dokl. Akad. Nauk SSSR, vol. 202, No. 2, pp. 347–350 (1972).

*Primary Examiner*—Thomas De Benedictis, Sr.
*Attorney, Agent, or Firm*—Robert J. North; Robert A. Harman

[57] ABSTRACT

A composition is described, useful as a thermoformable polymer, for producing shaped articles having high yield and impact strengths, good heat resistance, and good solvent resistance. The composition, which is cured, contains a crosslinked polycyanurate network polymer in which a high molecular weight thermoplastic polymer, such as a polyestercarbonate, is finely dispersed. The composition possesses a Vicat softening temperature (ASTM 1525) of at least about 10° C. above that of said thermoplastic polymer alone, and an elongation-at-break value (ASTM D-638, at room temperature) at least twice that of said crosslinked polymer alone. Due to the high yield strength, lighter structural articles and components can be fabricated from the composition possessing high structural strength.

25 Claims, No Drawings

THERMOFORMABLE COMPOSITIONS COMPRISING A CROSSLINKED POLYCYANURATE POLYMER AND A THERMOPLASTIC POLYMER

BACKGROUND OF THE INVENTION

1. Field of the Invention

This invention relates to novel thermoformable compositions comprised of a crosslinked polycyanurate network polymer in which a high molecular weight thermoplastic polymer is finely dispersed.

2. Brief Description of the Prior Art

Thermoplastic polymers, having a high glass transition temperature, are useful in a variety of industrial applications including the manufacture of many molded and shaped articles. For example, polyestercarbonates, a known class of thermoplastic polymers, are especially useful for producing protective windshields and canopies having excellent impact resistance, low processing temperatures and good flexibility, as described in U.S. application Ser. No. 764,623, which is hereby incorporated by reference. However, products made from thermoplastic polymers generally have the disadvantage of possessing marginal abrasion resistance and solvent resistance, under specific conditions, for example, such as contact with boiling solvent.

Crosslinked polymers, for example, polycyanurates (crosslinked cyanurate polymers) derived by the polycyclotrimerization of aromatic cyanates, are known to produce shaped articles possessing excellent hydrolytic and solvent resistance. However, the articles have low yield strength and poor flexibility. See for example, U.S. Pat. No. 4,026,913 of May 31, 1977 assigned to Mitsubishi Gas Chemical Co. at col. 1, lines 8–16, which describes cyanic acid esters of aromatic polycarbonates which can be cured to produce crosslinked polycyanurates. Also see the references, *Kunststoffe, Bd.* 58, pp. 827–832(1968) by R. Kubens et al., and *Dokl. Akad. Nauk SSSR*, Vol. 202, pp. 347–350 (1972) by V. V. Korshak et al., which describe the cyclotrimerization of aryl cyanurates and properties of crosslinked polymers derived therefrom. In addition, the references, U.S. Pat. No. 4,046,796 (1977) and German Offenlegungsschrifte Nos. 2,549,529; 2,546,296; and 2,546,315, describe processes for producing certain polyfunctional cyanic acid esters, e.g. from cyanuric acid chloride, hexamethylene diamine, bis-phenol-A, and cyanogen chloride, and cured products derived therefrom.

In general, blends made of physically distinct thermoplastic and crosslinked polymer compositions do not exhibit the combined desirable characteristics of both types of polymers due to a general inherent incompatibility of composition properties between the two types of polymers.

What is needed and what the prior art does not describe are substantially homogeneous compositions exhibiting the desirable characteristics of both thermoplastic and crosslinked polymer compositions and capable of forming shaped articles having excellent yield and impact strengths coupled with flexibility, thermal processability, good heat resistance and good solvent resistance.

SUMMARY OF THE INVENTION

In accordance with this invention there is provided a cured composition consisting essentially of a crosslinked cyanurate polymer and a thermoplastic polymer of at least film-forming molecular weight wherein the composition possesses (a) Vicat softening temperature of at least about 10° C. above that of said linear polymer alone as determined by ASTM 1525; and, (b) an elongation-at-break value which is at least twice as great as that of said crosslinked polymer alone as determined by ASTM D-638, at room temperature.

There is also provided a pre-cured composition comprising an intimate mixture of a thermoplastic polymer and an aromatic dicyanate monomer, said composition capable of forming the cured composition of this invention upon heating.

Also provided is a partially cured composition obtained by heating said pre-cured composition above about 200° C.

Further provided is a shaped article, such as a windscreen, comprising the cured composition of this invention.

There is also provided a reinforced composition comprising the cured composition of this invention.

Also provided is an article, such as a wire or thermoplastic article, having the cured composition of the invention deposited thereon.

Further provided is a shaped article comprising the partially cured composition of this invention.

Also provided is a process for producing the pre-cured composition of this invention comprising the step of mixing a melt containing a thermoplastic polymer and aromatic dicyanate monomer.

Further provided is a process for producing the pre-cured composition of this invention comprising the step of removing solvent from a solution of thermoplastic polymer and aromatic dicyanate monomer at a rate to cause simultaneous precipitation of the thermoplastic polymer and dicyanate monomer.

There is also provided a process for producing the cured composition of this invention comprising the steps of:

(a) removing solvent from a solution containing thermoplastic polymer and aromatic dicyanate monomer at a rate to cause simultaneous precipitation of the thermoplastic polymer and monomer thereby producing an intimate mixture of said polymer and monomer, and (b) heating said intimate mixture at a temperature above about 200° C., thereby producing crosslinked cyanurate polymer.

Another process is also provided for producing the cured composition of this invention comprising the steps of:

(a) mixing a melt containing a thermoplastic polymer and aromatic dicyanate monomer thereby producing an intimate mixture of said thermoplastic polymer and monomer; and (b) heating said intimate mixture at a temperature above about 200° C., thereby producing crosslinked cyanurate polymer.

DESCRIPTION OF THE INVENTION AND PREFERRED EMBODIMENTS

Polycyanurates, hereinafter referred to as crosslinked cyanurate polymers, have been found to provide an excellent matrix in which to disperse high molecular weight thermoplastic polymers thus producing compatible thermoformable compositions possessing the desirable characteristics of both thermoplastic and crosslinked polymer compositions. The compositions yield shaped articles having high yield and impact strength, high glass transition temperature and good solvent resistance at convenient processing temperatures. The cured composition possesses a Vicat softening temperature of at least about 10° C. above that of said thermoplastic polymer alone, as determined by ASTM 1525, and an elongation-at-break value, which is at least two times as great as that of said crosslinked polymer alone, as determined by ASTM D-638, at room temperature. It has superior properties with respect to yield strength, abrasion and solvent resistance as compared to a polycyanurate network polymer derived from a cyanate-terminated thermoplastic polymer alone, which thus allows the fabrication of lighter structural parts, such as beams and braces in automobiles and airplanes, having the same structural strength and integrity as heavier ones made from other polymer compositions.

The crosslinked cyanurate polymer component of the cured invention composition is formed in the presence of the thermoplastic polymer by polycyclotrimerizing an aromatic dicyanate monomer of the formula: NCO-R-OCN, wherein R is a divalent aromatic hydrocarbon residue and comprises at least one aromatic moiety, i.e., aromatic ring, including benzene, naphthalene, anthracene, phenanthrene and the like, and where R contains a total of up to 40 carbon atoms, including the aromatic moiety. For example, the 1,4-di(2'-phenylpropyl)benzene moiety, wherein the cyanate groups are attached in the para positions of the benzene rings of the phenylpropane substituents, is one embodiment of said R group. The aromatic rings of R may be further substituted with groups that are inert during the polymerization process, i.e. the polycyclotrimerization process, and include halogen, including fluorine, chlorine, bromine, and iodine; $C_1-C_4$ alkoxy, being linear or branched and including methoxy, ethoxy, isopropoxy, and t-butoxy; and $C_1-C_4$ alkyl carboxylic ester, being linear or branched, including methoxycarbonyl, ethoxycarbonyl, isopropoxycarbonyl and t-butoxycarbonyl; wherein the number of substituents on the aromatic rings may be one or more with the proviso that the groups are inert during the polymerization process and do not substantially interfere with the formation of the crosslinked triazine polymer upon polycyclotritrimerizing of the aromatic dicyanate moiety.

By the term "polycyclotrimerization" is meant forming a cyanurate ring system by the polymeric condensation of three aromatic cyanate groups to form the crosslinked aromatic ring system, which has as its basic repeating unit:

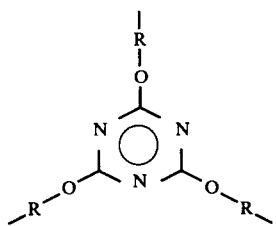

in which R substituents, as defined above, are attached to the oxygen atoms. Methods for conducting the polymerization are well known, including thermal annealing above about 200° C. and are described in the Korshak reference, discussed above, which is hereby incorporated by reference.

R substituents are preferably divalent aromatic hydrocarbon residues selected from (a) diphenol moiety; (b) diphenolester moiety, formed from aromatic dicarboxylic acids and diphenols; (d) diphenolestercarbonate moiety, formed from diphenol, aromatic dicarboxylic acid and carbonate precursor; or, mixtures thereof. The term "moiety," as used herein is meant to describe the parent diphenol-derived molecule, from which residue R is obtained, minus the terminal phenolic —OH groups, but including valence bonds on the aromatic rings in which the terminal phenolic —OH groups were positioned.

Diphenol moiety thus refers to the aromatic residue of diphenols, excluding the terminal phenolic —OH groups, but including their respective valence bonds. Representative examples of diphenol moiety, exemplified as the diphenol, include 2,2-bis(4'-hydroxyphenyl)-propane, referred to herein as bisphenol-A; 1,4-bis(4'-hydroxyphenylpropyl) benzene; 4,4'-diphenyl; 2,2-bis (3',5'-dimethyl-4'-hydroxyphenyl) propane: 2,2-bis (4'-hydroxyphenyl-1,1,1, 3,3,3-hexafluoropropane), and 9,9-bis(4'-hydroxyphenyl) fluorene. Preferred diphenol moiety is symmetrical and is 2,2-bis(4-hydroxyphenyl)-propane. Methods for producing aromatic dicyanate compounds are well known, as exemplified in U.S. Pat. No. 4,026,913, which is hereby incorporated by reference.

Diphenolester moiety refers to the aromatic residue of diphenolesters excluding the terminal phenolic —OH groups, but including their respective valence bonds, wherein said esters are formed from diphenols, as described above, and aromatic dicarboxylic acids in which the resulting ends of the total ester molecule are terminated by phenolic —OH groups. Representative examples of aromatic dicarboxylic acids useful in the invention to react with above described diphenols to prepare diphenol esters include, terephthalic acid, isophthalic acid, phthalic acid, 1,5-naphthalene dicarboxylic acid, 2,6-naphthalene dicarboxylic acid, benzophenone- 4,4'-dicarboxylic acid, 4,4'-dibenzobenzene-p-p'-dicarboxylic acid, 4,4'-biphenyl dicarboxylic acid, 1,1-bis(4-carboxyphenyl)-ethane, and 2,2-bis(4-carboxyphenyl)propane. Preferred aromatic dicarboxylic acid are terephthalic and isophthalic acids.

Preferred diphenolester moiety are those produced from terephthalic or isophthalic acids and 2,2-bis(4-hydroxyphenyl)-propane. Methods for producing said diphenylester moiety from diphenol and aromatic dicarboxylic acids are well known, in which an excess of diphenol is used and are described in copending U.S. Application Ser. No. 764,623, which is hereby incorporated by reference.

Diphenolcarbonate moiety refers to the aromatic residue of diphenolcarbonates, excluding the terminal phenolic —OH groups, but including their respective valence bonds, formed from diphenol, described above, and carbonate precursor in which the ends of the total carbonate molecule are terminated by phenolic —OH groups. By the term "carbonate precursor" is meant a compound containing carbonyl functionality, which when reacted with two moles of diphenol, forms a —O—CO—O— grouping. Representative examples of carbonate precursor include phosgene, bromophosgene, and diethylcarbonate. Preferred carbonate precursor is phosgene.

Diphenols useful in preparing the diphenolcarbonate moiety are described hereinabove and constitute representative examples of diphenolcarbonate moiety, including respective terminal phenolic —OH groups. Preferred diphenolcarbonate moiety is that produced from 2,2-bis(4-hydroxyphenyl)propane and phosgene. Methods for producing said diphenolcarbonate moiety are well known, in which an excess of diphenol is used and are described in U.S. Application Ser. No. 764,623.

Diphenolestercarbonate moiety refers to the aromatic residue of diphenolestercarbonate, excluding terminal phenolic —OH groups, but including their respective valence bonds, formed from diphenol, aromatic dicarboxylic acid and carbonate precursor, which are all individually described above, and constitute representative examples of diphenolestercarbonate moiety, in which the ends of the total carbonate molecule are terminated by phenolic —OH groups.

Preferred diphenolestercarbonate moiety is that formed from bisphenol-A, terephthalic acid and phosgene, wherein substantially all of the molecules are phenolic —OH group-terminated. Methods for producing diphenolestercarbonate are well known and are described in U.S. Application Ser. No. 764,623.

Particularly preferred R substituents in the aromatic dicyanate monomer include, representing the moieties by chemical structures,

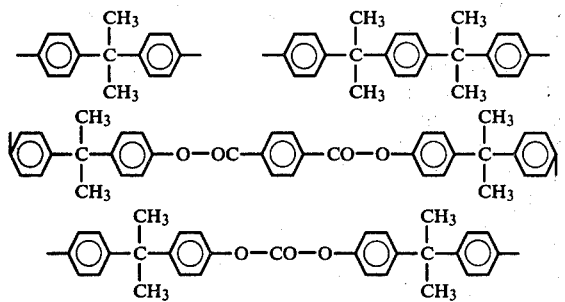

or mixtures thereof.

Thermoplastic polymers applicable in the invention are those having at least a film-forming molecular weight. By the term "film-forming molecular weight" is meant a number average molecular weight, $M_n$, in the range of at least about 8,000 to 10,000, as measured by the standard method of vapor pressure osmometry, such that the thermoplastic polymer, dissolved in solvent, is capable of forming a film by evaporation upon a suitable substrate. Generally, thermoplastic polymers, of number average molecular weights below about 8,000, do not possess this property and do not impart properties of high impact strength resistance to the composition of this invention.

Thermoplastic polymer used in this invention preferably has a number average molecular weight, $M_n$, of about 10,000 to about 40,000 as measured by vapor pressure osmometry, and is preferably a polyestercarbonate.

Polyestercarbonate used as thermoplastic polymer in this invention can be produced from a combination of diphenol, aromatic dicarboxylic acid and carbonate precursor, which are individually discussed above. However, thermoplastic polyestercarbonate need not be terminated substantially with phenolic —OH groups but can also be terminated with acid or carbonate groups. Methods for producing polyestercarbonates are well known and are described in U.S. Application Ser. No. 764,623.

A preferred polyestercarbonate is that described in U.S. Application Ser. No. 764,623 and produced from bisphenol-A, phosgene and terephthalic acid in which the $M_n$ is about 10,000 to about 30,000, and the Vicat softening temperature is at least about 165° C.

The cured composition of this invention contains crosslinked cyanurate network polymer in which thermoplastic polymer is finely dispersed and preferably wherein the thermoplastic polymer and the crosslinked polymer are both present in at least about 10 weight percent of the total composition. A particularly preferred composition is that wherein the weight ratio of the crosslinked cyanurate polymer to thermoplastic polymer is about 1:1.

Also included in this invention are pre-cured and partially cured compositions, both capable of forming the cured composition of this invention upon heating.

The precured composition comprises an initimate mixture of a thermoplastic polymer, of about film-forming molecular weight, discussed hereinabove, and an aromatic dicyanate monomer. By the term "intimate mixture" is meant a mixture wherein the degree of mixing of monomer and polymer is such that the mixture approaches solid solution. The aromatic dicyanate monomer and thermoplastic polymer used in the composition are the same as described above for the cured composition of the invention.

The partially cured composition of this invention comprises the pre-cured composition, described above, which has been heated above 200° C., to initiate the polycyclotrimerization process of the aromatic dicyanate monomer.

In general, by the term "partially cured" is meant that the free cyanate functionality in the composition is at least about 75% of the original amount, as determined by the method of infrared spectrophotometry. By the term "cured" is meant that the free cyanate functionality in the composition is less than about 25% as determined by infrared spectrophotometry. By the term "pre-cured" is meant that the free cyanate functionality content of the composition is substantially the same or in the original amount as determined by the above-discussed method.

Processes for producing the cured composition are also a part of this invention and include a solution process. A solution of thermoplastic polymer and aromatic dicyanate monomer, as described herein, is formed in a suitable solvent. The solvent is then removed from the solution at a rate to cause simultaneous precipitation of the thermoplastic polymer and the monomer thereby producing an intimate mixture of said polymer and monomer, the pre-cured composition as described above.

Heating the resulting intimate mixture at a temperature above about 200° C. and preferably about 300° C., will promote the "curing" process, i.e., polycyclotrimerization of the aromatic dicyanate monomer to form crosslinked cyanate polymer. Briefly heating the intimate mixture at this temperature for periods of about 2 to 5 minutes at about 300° C. produces partially cured composition and heating the intimate mixture for periods of about 10 to 30 minutes at the same temperature produces fully cured compositions. Heating can be accomplished by known methods in the art such as oven, vacuum, hot air annealing, compression molding and the like.

Solvents useful in the invention process are those having good solubility for the thermoplastic polymer and monomer and having boiling points lower than 150° C. for ease of removal from the solution. Representative solvents include dichloromethane, chloroform, trichloroethane, chlorobenzene, and o-dichlorobenzene. Preferred examples are dichloromethane and Chloroform.

The solution of monomer and thermoplastic polymer in solvent is generally about 5 to 40 weight-volume percent and it is preferred to employ solutions of monomer and polymer wherein each are present in about 5 to 25 weight-volume percent.

Solvent removal from the solution of thermoplastic polymer and monomer can readily be accomplished by evaporation, atmospheric distillation, vacuum distillation or freeze drying, techniques well known in the art. It is preferred to use vacuum distillation as the means for removing solvent.

Further, a process is provided for producing the composition of this invention which comprises the step of mixing a melt containing a thermoplastic polymer and aromatic dicyanate monomer, thereby providing an intimate mixture of said thermoplastic polymer and monomer. The intimate mixture may then be heated at a temperature above about 200° C. to yield a partially cured or a cured composition as discussed above.

A melt of said polymer and monomer in the process may be obtained in several ways, such as by melt blending of a mixture of the two or by a melt extrusion process. In a melt extrusion process, the conditions can be regulated such that the material is mixed, melted and extruded at a temperature above about 200° C. over varying time periods, thus forming partially cured or cured composition.

The cured composition and partially cured compositions of this invention are useful in forming a wide variety of industrial products, including shaped articles, as produced by known shaping processes. Shaped articles produced from the polymer composition include windscreens such as windshields, canopies, door windows and wire housing. The shaping process can be any process known to one skilled in the art, such as injection, blow or extrusion molding.

A reinforced composition comprising the cured composition of this invention is also part of the invention disclosed herein. The cured composition as described, may contain other materials such as fiberglass, steel, wood, and inorganic fillers, for use in reinforcing applications where the structural strength and integrity of a structure has to be maintained. Methods for producing reinforced composition include melt blending, extrusion and molding processes, simple mixing and dispersion of both materials in a suitable medium by methods known in the art.

The cured composition of this invention may also be deposited on an article and used as a coating material. The article may be any useful article including a wire, conducting material, glass, polyestercarbonate windshield, and structural parts such as supporting beams. Preferred in this regard is a thermoplastic article, such as a windscreen, having the cured composition of this invention deposited thereon; for example, to improve the abrasion and solvent resistance of said article. Methods of depositing said cured composition on an article may be by melting the composition and allowing to flow on the surface of the article or alternately by applying pre-cured or partially cured composition of this invention to the article and subjecting said composition to curing by heating above about 200° C.

PREPARATION OF MATERIALS

1. Preparation of cyanato-terminated polyestercarbonate

Bisphenol-A (1 mole) and pyridine (2.5 moles) were dissolved in 2500 ml. of dichloromethane (DCM) to form about a 10% by weight solution of bisphenol-A. To this solution was added slowly (in about 30 min.) a 10% by weight solution of 0.5 mole of terephthaloyl chloride at room temperature. The resulting mixture was stirred for a half hour. A phosgenation step was then carried out by passing 0.5 moles of phosgene gas through the solution. The reaction was then terminated by adding 100 ml of water. The resulting mixture was then poured into 8 liters of 90/10 (by volume) acetone/water mixture, thus precipitating low molecular weight polyestercarbonate. The product was collected by filtration, dried and purified by redissolving in 3000 ml. DCM and reprecipitated by pouring into an acetone-water mixture. The purified polyestercarbonate (PEC) was collected by filtration, and dried in a vacuum over for 12 hours, yielding 240 grams of product, having a $M_n$ of about 2700, as measured by vapor pressure osmometry.

A rerun of the above reaction, in which a slight excess of phosgene was utilized, resulted in product PEC having a $M_n$ of about 4000.

Purified PEC, 100 grams, of $M_n=2700$, as prepared above, were dissolved in 500 ml of chloroform and 6.0 grams of cyanogen bromide was added to the solution, while being cooled in an ice bath. Seven grams of triethylamine in 20 ml of chloroform were then added dropwise to the solution. After the addition, the reaction solution was stirred for 1 hour at room temperature. The reaction solution was filtered and the filtrate poured into 2 liters of vigorously stirred methanol. The precipitated polymer was filtered and reprecipitated twice and dried, to yield 95 grams of cyanato-terminated polyestercarbonate.

The product was characterized as having an intrinsic viscosity of about 0.13, as measured by solution viscosity, and a free cyanate functionality (—OCN) content of about 2.3% as measured by infrared spectrophotometry.

PEC, having a $M_n$ of 4000, was treated in the same manner as described above and yielded a cyanato-terminated polyestercarbonate having an intrinsic viscosity of about 0.19, and a free cyanate (—OCN) functionality content of about 2%.

2. Preparation of Bis(4-cyanato phenol)A

Into a solution of bisphenol-A (77 g, 0.34 mol) and cyanogen bromide (70 g, 0.66 mol) in 500 ml of acetone, 70 g of triethylamine (0.69 mol) was added. The reaction solution was stirred in an ice bath for 1 hour after the addition and filtered. The filtrate was then poured into 300 ml of ice water and bis(4-cyanato phenol)A precipitated from the solution. The crude bis(4-cyanato phenol)A was purified by dissolving in 300 ml acetone and reprecipitating in 1:1 mixture of methanol/water at 5° C.

Anal. for $C_{17}H_{14}N_2O_2$: Anal. Calcd: C, 73.38; H, 5.03; N, 10.07; Found: C, 71.89; H, 5.37; N, 9.90.

3. Preparation of Intimate Mixture (Pre-Cured) of Poly(biscyanatophenol-A) Containing Poly(bisphenol-A terephthalate Carbonate)

Bis(4-cyanatophenol)A, 15 grams and polyestercarbonate, $M_n = 17,010$, 15 grams, were dissolved in 300 ml. dichloromethane. The solution was evaporated under reduced pressure (40 mm Hg) to yield a residue, which was dried in a vacuum oven at 110° C. for 12 hours to yield 30 grams of an intimate mixture of thermoplastic polymer and aromatic cyanate monomer, in a 1:1 weight ratio.

PHYSICAL TESTS

1. Cantilever Beam Test

A sample of polymer was machined to a piece of dimensions, 5"×½". The sample, which was clamped on one end, was bent by placing a weight on the free end. A piece of filter paper of 5"×1" soaked with testing solvent, which was perchloroethylene, was placed on the tested sample for 5 min. After 5 min. the sample was visually examined to determine the extent of cracked surface. The stress at the boundary between undamaged and uncracked area is calculated by known methods in the art and expressed in psi units.

2. Vicat Penetration Test (ASTM 1525)

A sample was placed in an oil bath. Then a needle having a point area of 1 $mm^2$ was placed on the sample surface with a weight of 1 kg. The oil bath was heated at the rate of 120° C./hr. The temperature at which the needle penetrated 1 mm into the sample was the reported Vicat softening temperature.

3. Elongation-to-break, modulus and yield stress properties were measured by ASTM D-638, at room temperature.

COMPARATIVE TEST

Cross-Linked Cyanato-Terminated Polyestercarbonates

Samples of low molecular weight PEC ($M_n = 2700$ and 4000) as described above, were compression molded in a hydraulic press at 300° C. for periods of 10 to 30 minutes.

The mechanical properties of the resulting cross-linked polyestercarbonates versus a control of $M_n = 17,000$, as measured by the physical tests described above, are listed in Table I.

TABLE I

| | Sample | | Yield | | Break | | |
|---|---|---|---|---|---|---|---|
| | $M_n$ | Heating Time | Elongation | Stress (PSI) | Elongation | Stress (PSI) | Modulus |
| 1. | 2,700 | 10 min | 23.3 | 9390 | 27.9 | 8960 | 217,950 |
| 2. | 2,700 | 20 min | 24.6 | 8530 | 32.6 | 8530 | 202,210 |
| 3. | 2,700 | 30 min | 26.2 | 9195 | 29.6 | 9000 | 178,870 |
| 4. | 4,000 | 30 min | 20.4 | 9740 | 30.6 | 8690 | 257,010 |
| 5. | 17,000 | — | 13.0 | 9300 | 25.4 | 9100 | 350,000 |

(PEC Control)

EXAMPLE 1

Composition Containing Poly [bis-(4-cyanatophenol)A] as Cross-Linked Cyanurate Polymer and Thermoplastic High Molecular Weight Polyestercarbonate Intimate mixtures, produced in Example 3 of Preparation of Materials in which there was a 1:1 weight ratio of bis(4-cyanatophenol)A and polyestercarbonate, and a polyestercarbonate control of $M_n = 17,000$, were compression molded at 300° C. for 10, 20 and 30 minute intervals, respectively. Vicat softening temperatures (VST) are listed below in Table II.

TABLE II

| VICAT SOFTENING TEMPERATURE | |
|---|---|
| SAMPLE | VST, °C. |
| 1. PEC Control | 172 |
| 2. Intimate mixture heated at 300° C. for 10 minutes | 189 |
| 3. Intimate mixture heated at 300° C. for 20 minutes | 205 |
| 4. Intimate mixture heated at 300° C. for 30 minutes | 206 |

As is seen, formation of crosslinked cyanurate polymer led to an increase in Vicat softening temperature of the resulting composition.

Mechanical properties of two cured compositions, prepared by heating above described intimate mixtures at 15 and 30 minute periods are listed below in Table III, versus completely cured poly(bis-cyanatophenol-A), "PCP".

TABLE III

| Sample | | MECHANICAL PROPERTIES | | | | |
|---|---|---|---|---|---|---|
| | | Yield | | Break | | |
| Ratio of PEC/PCP (W/W) | Heating Time | Elongation | Stress (PSI) | Elongation | Stress (PSI) | Modulus |
| 1. 1:1 | 15 min | 21.9 | 11,960 | 21.9 | 11,960 | 227,710 |
| 2. 1:1 | 30 min | 23.1 | 11,500 | 23.1 | 11,500 | 257,220 |
| 3. Poly(bis-4-cyanatophenol-A) (PCP). | | — | — | 1.5 | 9,950 | 426,700 |

Comparing yield stress and modulus data of Table I with the same data in Table III, it can be seen that a polycyanurate network polymer containing a finely dispersed high molecular weight thermoplastic polyestercarbonate has superior mechanical properties with respect to yield stress and elongation-to-break values as compared to a polycyanurate prepared from a cyanato-terminated polyestercarbonate.

Comparative solvent resistance properties, expressed as "minimum crazing stress," for a linear polyestercarbonate, polycyanato-terminated estercarbonate and a cured composition of this invention are illustrated below in Table IV.

TABLE IV

SOLVENT RESISTANCE PROPERTIES

| Sample | Solvent | Minimum Crazing Stress (PSI)[a] |
|---|---|---|
| 1. PEC Control ($M_n$ = 17,000) | perchloroethylene | 1,500 |
| 2. Sample 3 from Table I | " | 2,000 |
| 3. Sample 2 from Table III | " | 15,000 |

[a] Minimum fiber stress to cause visible crazing after 5 minutes in the cantilever beam test.

As is seen in the above table, the stress crazing resistance of the cured composition of this invention is superior to that of linear polyestercarbonate alone, or crosslinked cyanatoterminated estercarbonate alone.

In addition, Sample 2 in Table III, exhibits an Izod impact strength of 3.8 ft.-lb./inch notch as determined by ASTM D-256-56. This value is very significant since, in general, highly crosslinked polymers yield shaped articles having Izod impact strengths usually less than about 1.0.

What is claimed:

1. A cured composition consisting essentially of a crosslinked cyanurate polymer and a thermoplastic polymer of at least film-forming molecular weight, wherein the composition possesses:
   (a) a Vicat softening temperature of at least about 10° C. above that of said linear polymer alone, as determined by ASTM 1525; and,
   (b) an elongation-at-break value which is at least twice as great as that of said crosslinked polymer alone, as determined by ASTM D-638, at room temperature.

2. The composition of claim 1 wherein the crosslinked polymer is formed by polycyclotrimerizing an aromatic dicyanate monomer of the formula:

NCO—R—OCN wherein R comprises at least one aromatic moiety and contains 6-40 carbon atoms, in which the aromatic rings may be further substituted with groups, inert during the polymerization, selected from halogen, $C_1$-$C_4$ alkyl, $C_1$-$C_4$ alkoxy and $C_1$-$C_4$ alkyl carboxylic ester.

3. The composition of claim 2 wherein R of said compound is a:
   (a) diphenol moiety;
   (b) diphenolester moiety, formed from aromatic dicarboxylic acid and diphenol;
   (c) diphenolcarbonate moiety, formed from diphenol and carbonate precursor;
   (d) diphenolestercarbonate moiety, formed from aromatic dicarboxylic acid, diphenol and carbonate precursor; or mixtures thereof.

4. The composition of claim 3 wherein R is

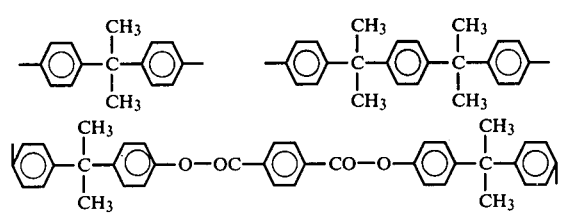

or mixtures thereof.

5. The composition of claim 1 wherein said crosslinked polymer alone has an elongation-at-break value of about 0.5 to about 5 percent.

6. The composition of claim 1 wherein said linear polymer alone has a Vicat softening temperature of at least about 50° C.

7. The composition of claim 1 wherein said linear polymer has a number-average molecular weight, $M_n$, of at least about 10,000.

8. The composition of claim 1 wherein said thermoplastic polymer is a polyestercarbonate.

9. The composition of claim 8 wherein said polyestercarbonate is formed from phosgene, bisphenol-A, terephthalic acid, or equivalents thereof.

10. The composition of claim 9 wherein said crosslinked polymer is a polycyanurate of 2,2-bis(4-cyanatophenyl) propane.

11. The composition of claim 10 wherein said crosslinked polymer and said thermoplastic polymer are present in about a 1:1 weight ratio.

12. The composition of claim 10 having a Vicat softening temperature of at least about 170° C.

13. A pre-cured composition comprising an intimate mixture of a thermoplastic polymer and an aromatic dicyanate monomer, said composition capable of forming the composition of claim 1 upon heating.

14. The composition of claim 13, partially cured by heating above about 200° C.

15. A process for producing the pre-cured composition of claim 13 comprising the step of removing solvent from a solution of thermoplastic polymer and aromatic dicyanate monomer at a rate to cause simultaneous precipitation of the thermoplastic polymer and dicyanate monomer.

16. A process for producing the pre-cured composition of claim 13 comprising the steps of mixing a melt containing a thermoplastic polymer and aromatic dicyanate monomer.

17. A process for producing the cured composition of claim 1 comprising the steps of:
   (a) removing solvent from a solution containing thermoplastic polymer and aromatic dicyanate monomer, at a rate to cause simultaneous precipitation of the thermoplastic polymer and the monomer thereby producing an intimate mixture of said polymer and monomer; and
   (b) heating said intimate mixture at a temperature above about 200° C., thereby producing crosslinked cyanurate polymer.

18. A process for producing the cured composition of claim 1 comprising the steps of:
   (a) mixing a melt containing a thermoplastic polymer and aromatic dicyanate monomer thereby producing an intimate mixture of said thermoplastic polymer and monomer; and
   (b) heating said intimate mixture at a temperature above about 200° C., thereby producing crosslinked cyanurate polymer.

19. A shaped article comprising the cured composition of claim 1.

20. The article of claim 19 where said article is a windscreen.

21. A reinforced composition comprising the cured composition of claim 1.

22. An article having the cured composition of claim 1 deposited thereon.

23. The article of claim 22 wherein said article is a wire.

24. The article of claim 22 wherein said article is thermoplastic.

25. A shaped article comprising the partially cured composition of claim 14.

* * * * *